US010827739B2

(12) United States Patent

MacKenzie

(10) Patent No.: US 10,827,739 B2
(45) Date of Patent: Nov. 10, 2020

(54) CALIBRATION DEVICE, A SPRAYING SYSTEM AND A METHOD OF CALIBRATION

(71) Applicant: MACKENZIE RESEARCH GROUP LIMITED, Ashburton (NZ)

(72) Inventor: Craige Hector MacKenzie, Ashburton (NZ)

(73) Assignee: Mackenzie Research Group Limited, Ashburton (NZ)

( * ) Notice: Subject to any disclaimer, the term of this patent is extended or adjusted under 35 U.S.C. 154(b) by 415 days.

(21) Appl. No.: 15/127,145

(22) PCT Filed: Mar. 10, 2015

(86) PCT No.: PCT/NZ2015/050024
§ 371 (c)(1),
(2) Date: Sep. 19, 2016

(87) PCT Pub. No.: WO2015/142190
PCT Pub. Date: Sep. 24, 2015

(65) Prior Publication Data

US 2017/0112118 A1 Apr. 27, 2017

(30) Foreign Application Priority Data

Mar. 20, 2014 (NZ) ........................................ 622729

(51) Int. Cl.
*A01M 7/00* (2006.01)
*A01G 22/00* (2018.01)
(Continued)

(52) U.S. Cl.
CPC ......... *A01M 7/0089* (2013.01); *A01C 23/007* (2013.01); *A01C 23/023* (2013.01); *A01G 22/00* (2018.02); *B05B 12/122* (2013.01)

(58) Field of Classification Search
CPC .... A01C 21/007; A01C 23/02; A01M 7/0089; B05B 12/122; A01G 22/00
See application file for complete search history.

(56) References Cited

U.S. PATENT DOCUMENTS 5,434,604 A 7/1995 Cleary et al.
6,360,179 B1 * 3/2002 Reep .................... A01D 41/127
702/104
(Continued)

FOREIGN PATENT DOCUMENTS

DE 41 32 637 A1 4/1993
DE 10 2009 040904 A1 3/2011
(Continued)

OTHER PUBLICATIONS

International Preliminary Report on Patentability for International Application No. PCT/NZ2015/050024 dated Oct. 25, 2016 (40 pages).
(Continued)

*Primary Examiner* — Kyle R Quigley
(74) *Attorney, Agent, or Firm* — Merchant & Gould P.C.

(57) ABSTRACT

A calibration device that utilises sensor data from an optical sensor to develop one or more calibration parameters for controlling operation of a sprayer utilising itself optical sensors and transmitting the calibration parameters to said sprayer. A method of calibrating a sprayer utilising the calibration information is also disclosed. A method of pasture or crop management for a region of interest in which a composite representation of cumulative substance applications is used to developing a representation in which sub regions of the region of interest having prescribed characteristics are visually differentiated from other regions. The spatial distribution of calibration values may also be recorded and used to analyse substance application against
(Continued)

calibration values to develop a report of apparently anomalous calibration values.

12 Claims, 3 Drawing Sheets

(51) Int. Cl.

| | |
|---|---|
| ***B05B 12/12*** | (2006.01) |
| ***A01C 23/00*** | (2006.01) |
| ***A01C 23/02*** | (2006.01) |

(56) References Cited

U.S. PATENT DOCUMENTS

| | | | | |
|---|---|---|---|---|
| 6,393,927 | B1 * | 5/2002 | Biggs | A01C 21/007 73/866 |
| 2001/0036295 | A1 * | 11/2001 | Hendrickson | G01J 3/2803 382/110 |
| 2002/0024665 | A1 | 2/2002 | Masten | |
| 2005/0024213 | A1 | 2/2005 | Franzen et al. | |
| 2010/0222922 | A1 | 9/2010 | Holland | |
| 2010/0283603 | A1 | 11/2010 | Yule et al. | |
| 2012/0016517 | A1 | 1/2012 | Holland | |
| 2012/0195496 | A1 | 8/2012 | Zaman et al. | |
| 2013/0044919 | A1 * | 2/2013 | Purcell | G01N 21/25 382/110 |
| 2013/0068892 | A1 * | 3/2013 | Bin Desa | B64C 39/024 244/190 |

FOREIGN PATENT DOCUMENTS

| | | | |
|---|---|---|---|
| EP | 1 183 929 | A2 | 3/2002 |
| NZ | 254659 | A | 9/1996 |
| WO | 03/009669 | A1 | 2/2003 |
| WO | 2011/102739 | A1 | 8/2011 |

OTHER PUBLICATIONS

International Search Report and Written Opinion of the International Searching Authority for corresponding International Patent Application No. PCT/NZ2015/050024 dated Feb. 15, 2016, 22 pgs.

* cited by examiner

CALIBRATION DEVICE, A SPRAYING SYSTEM AND A METHOD OF CALIBRATION

This application is a National Stage Application of PCT/NZ050024, filed 10 Mar. 2015, which claims benefit of Serial No. 622729, filed 20 Mar. 2014 in New Zealand, and which applications are incorporated herein by reference. To the extent appropriate, a claim of priority is made to each of the above disclosed applications.

FIELD OF THE INVENTION

The present invention relates to a calibration device for use with a sprayer, a spraying system and a method of calibrating optical sensors of a sprayer.

BACKGROUND TO THE INVENTION

In a number of spraying applications it is desirable to distribute a substance to an area of interest based on the different requirements of different sub-regions. The application of substances to plants is a preferred application of the present invention. This includes the application of substances to pasture and crops.

The application of nitrogen and nitrate inhibitor to a pasture is known in the art of pastoral farming. Commonly nitrogen is distributed evenly across a field or pasture to promote growth of the desired crop species.

Equally, the application of nitrate inhibitor to a pasture is commonly performed by evenly distributing nitrate inhibitor across the field or pasture, without accounting for localised areas of high nitrogen.

Methods of detecting areas of high nitrogen are known in the art, however most are complex and involve the testing of soil and plant tissue. One method which does not use chemicals, relies on the effect of nitrogen on the growth rates of plants. Plants growing in areas having a high level of nitrogen will grow much more rapidly than plants growing in areas having a low level of nitrogen in the soil. Therefore, by analysing the relative growth of plants across a field or pasture, the regions having high levels of nitrogen can be determined. The only commonly employed method known to the applicant for selectively applying nitrate inhibitor to these areas of high nitrogen is to manually apply nitrate inhibitor to those areas exhibiting more rapid plant growth.

Methods for differentiating plants from their surroundings are known in the art, one such example is detailed in NZ 254659. This patent specification discloses an apparatus which projects two wavelengths of light which are readily absorbed by the chlorophyll in plants and wavelengths of light which are strongly reflected by the chlorophyll in plants. By analysing the light reflected, the apparatus is able to determine both the presence and size of a plant due to the amount of light absorbed by the chlorophyll. The apparatus of NZ 254659 describes a method for the application of weed spray to plants which meets a certain user calibrated threshold of reflected chlorophyll absorbent light to reflected non chlorophyll absorbent light (i.e. the condition that exists when a plant is detected).

The applicant's patent application WO2011/102739A1 discloses a method for controlling the spraying of a substance to provide normal and inverted spraying modes (i.e. applying a substance, such as a weed spray or nitrification inhibitor, to areas when certain conditions are determined to exist or when certain conditions are determined not to exist).

The optical sensors utilized in the spraying systems described above require calibration to set thresholds to achieve a desired substance application. Calibration values could be obtained by testing of soil and plant tissue but this would be is time consuming, inconvenient and expensive.

In-field calibration is often undertaken but this is difficult as it is not always easy to find a uniform area to calibrate as the crop/pasture or target weed area is inherently variable and the sprayer has an array of sensors spanning a large area. Further, this approach is a very coarse method of sampling and does not take into account relatively small randomly located spots that may have a highly localised level of nitrogen/weeds. Such small spots of high nitrogen/weeds arise due to, for example, animal excrement or decomposition of organic matter. Under the current approach, these spots have yet further nitrogen added. This is both an additional cost to the farmer and can be a source of nitrates leaching into nearby waterways and aquifers. This approach also wastes operator time and the substance sprayed and thus incurs costs for an operator. Further these methods may result in non-optimum calibration values being used for spraying.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

Disclosure of the Invention

According to one aspect of the present invention, there is provided a calibration device for use with a sprayer utilising optical sensors to control the distribution of a substance via one or more controllable spraying outlets, the calibration device including:

a. an optical sensor for sensing optical characteristics of an area of interest and producing optical sensor data;
b. a processor which utilises the optical sensor data to develop one or more calibration parameters for controlling operation of the sprayer; and
c. a transmitter for communicating the one or more calibration parameters to a sprayer.

According to another aspect there is provided a spraying system including:

a. a calibration device including:
  i. an optical sensor for sensing optical characteristics of an area of interest and producing optical sensor data;

ii. a processor which utilises the optical sensor data to develop one or more calibration parameters for controlling operation of a sprayer; and iii. a transmitter for communicating the one or more calibration parameters to a sprayer;

and b. a sprayer including:

i. one or more controllable spraying outlets;

ii. one or more optical sensors which sense optical properties of an area proximate a respective spraying outlet;

iii. a receiver for receiving one or more calibration parameters from a calibration device; and iv. a controller that controls the distribution of a substance from each outlet in dependence upon the one or more calibration parameters and information from an associated optical sensor.

According to another aspect there is provided a method of calibrating a sprayer utilising optical sensors to control the distribution of a substance via one or more controllable spraying outlets comprising:

a. obtaining one or more optical measurements of one or more attributes of an area to be sprayed utilising a portable calibration unit;

b. transferring calibration information developed from the optical measurements to the sprayer; and c. utilising the calibration information to calibrate one or more optical sensors of the sprayer.

According to another aspect there is provided a method of pasture or crop management for a region of interest comprising:

a. recording the spatial distribution of a substance by a sprayer for a plurality of substance applications at different times;

b. developing a composite representation of cumulative substance applications; and c. developing a representation in which sub-regions of the region of interest having prescribed characteristics are visually differentiated from other regions.

According to another aspect there is provided a method of pasture or crop management for a region of interest comprising:

a. recording the spatial distribution of a substance sprayed by a sprayer for a plurality of substance applications at different times;

b. recording the spatial distribution of calibration values used for the plurality of substance applications;

c. for sub-regions of the region of interest analysing substance application against calibration values; and d. developing a report of apparently anomalous calibration values based on the analysis.

BRIEF DESCRIPTION OF THE DRAWINGS

Further aspects of the present invention will become apparent from the following description which is given by way of example only and with reference to the accompanying drawings in which.

DETAILED DESCRIPTION OF THE INVENTION

By way of example only, the present invention will be described in relation to the application of nitrogen, nitrate inhibitor or weed spray to an area of interest in the form of a pasture, crop, field etc. However, as will be appreciated by those skilled in the art, the present invention may be suitable for the selective application of different substances to any area of interest.

Figure 1:
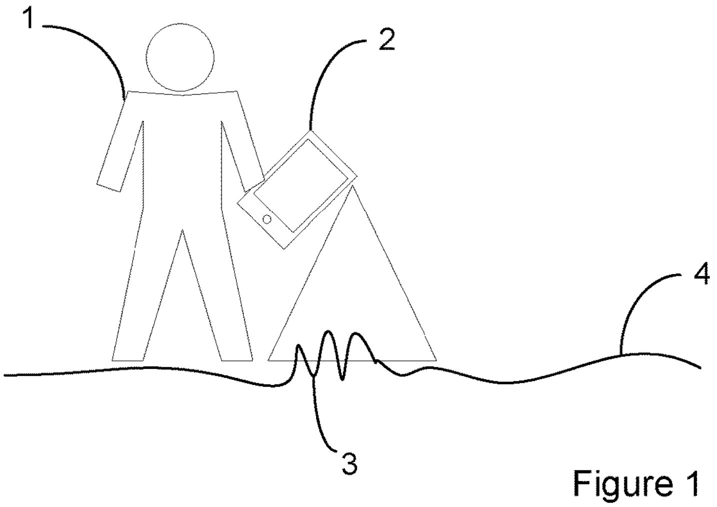
FIG. 1 shows a portable calibration device being used to measure optical characteristics of an area of interest.
Figure 3:
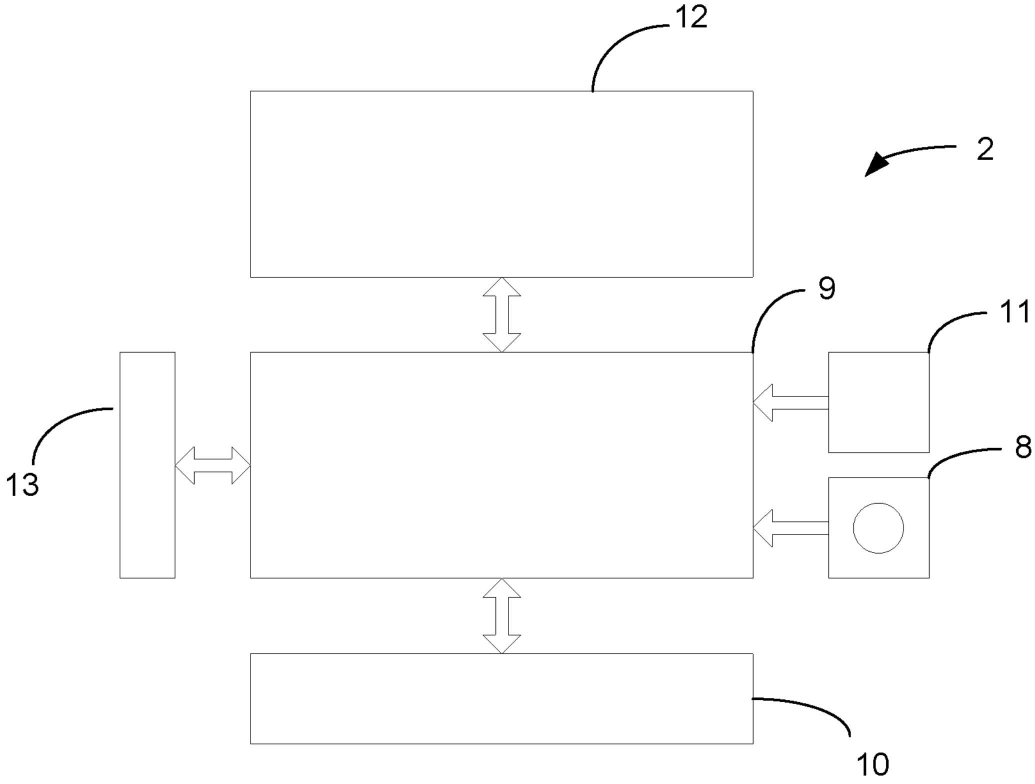
FIG. 3 shows a block diagram of the components of a calibration unit according to one embodiment.

Referring to FIGS. 1 and 3 a user 1 is using a calibration device 2 to sense optical characteristics of a sub-area 3 of an area of interest 4. In this case the calibration device may be a portable hand held device. The optical sensor could simply be a camera 8 and the optical sensor data may be an image of a sub-area 3. Image information is provided to a processor 9 which stores information derived from the image in memory 10. In one embodiment each image could be analysed by processor 9 to identify the shapes of targets to be sprayed or not sprayed and the target type could be stored in memory 10. Alternatively the image could be analysed (i.e. analyse the strength of signal for all pixels in a selected frequency band as an optical sensor of a sprayer would) to provide a calibration value to be supplied to a sprayer to calibrate optical sensors of the sprayer and the calibration values may be stored in memory 10. A touch display 12 displays images from camera 8 and allows user input.

Figure 4:
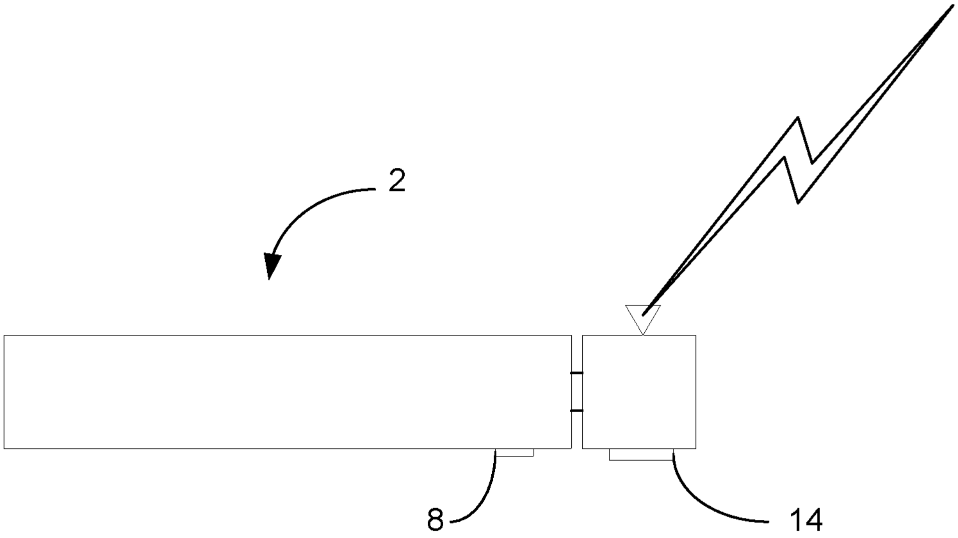
FIG. 4 shows the construction of a calibration unit with a removable camera and positioning system.

There may be difficulties exactly correlating data from a camera with data produced from an optical sensor of a sprayer and so in another embodiment shown in FIG. 4 the portable hand held device 2 may include an optical sensor 14 of the type employed in a sprayer so that the calibration values produced by the portable hand held device are well correlated. Where both a camera 8 and optical sensor 14 are employed target shape identification based on an image obtained by camera 8 may inform information obtained by optical sensor 14 (i.e. if the shape is identified as a weed then the value obtained by optical sensor 14 may be associated with a weed "type").

In use a user may walk around a field etc. to obtain optical sensor data for a number of sub-regions. These sub-regions could be a range of different types of sub-regions to simply give an average for the area of interest. Preferably though the user will enter the "type" (e.g. clear pasture, weeds, excrement etc.) of each sub-region in the portable device 2 when acquiring each sample. In this way calibration values associated with different conditions may be developed. This may enable calibration ranges to be set for different "types".

The portable device may also include a positioning system 11, such as GPS, to also record the position of each measurement. This may enable calibration values to be associated with selected positions or areas within an area of interest. Where the portable device 2 is incorporated in a land based or flying vehicle, such as a UAV, measurements may be obtained over the entire area of interest so that each location has one or more associated calibration values. This may enable a calibration value to be developed for each optical sensor of a sprayer at each location in an area of interest.

Figure 2:
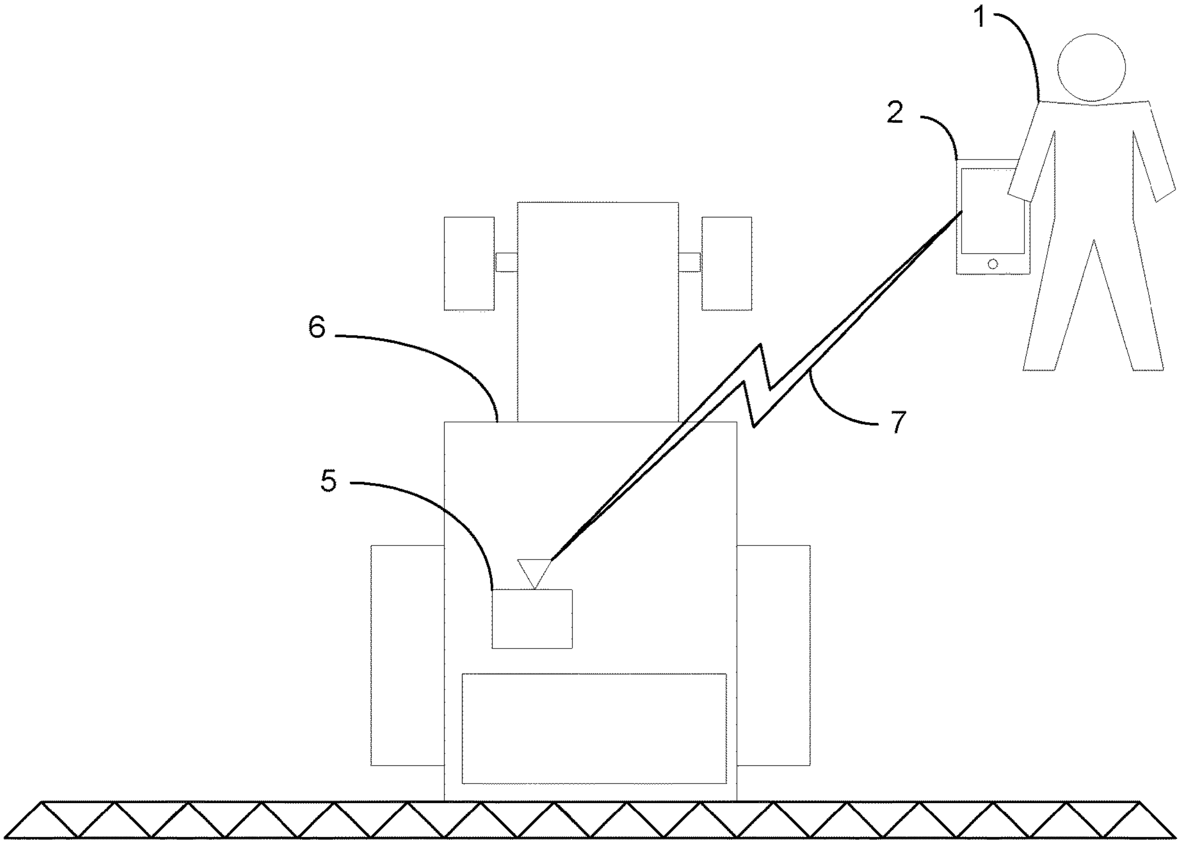
FIG. 2 shows calibration information being transferred to a controller of a sprayer.

As shown in FIG. 2, once the measurements have been made, portable device 2 may send calibration information to a controller 5 of a sprayer 6 to properly calibrate optical sensors associated with each outlet. The calibration information may be sent via a wireless link or via a cable etc.

utilizing port 13. The calibration information may include the one or more calibration values or may be the raw data for the controller 5 to process. In the examples below the calibration values are developed by the portable device.

In some situations a single calibration value may be sufficient to simply determine at what levels each outlet should spray or not spray. In one embodiment, as discussed above, a user may enter a "type" (e.g. clear pasture, weeds, excrement etc.) associated with a sub-region and from a number of samples calibration values representative of a type may be developed. Readings outside of a permitted range may be excluded from consideration to avoid anomalies skewing results. The value associated with each type may be a simple average or may be calculated using a non-linear algorithm, neural network, fuzzy logic or other such approach.

The average (or otherwise derived) values developed for each "type" may be displayed to a user and one or more suggested spraying threshold value may be presented for selection. Alternatively a user may enter a user selected value via touch display 12 based on the information presented. Using a single value for all optical sensors is most closely aligned with the operation of current equipment and so may be readily retrofitted to existing equipment.

Figure 5:
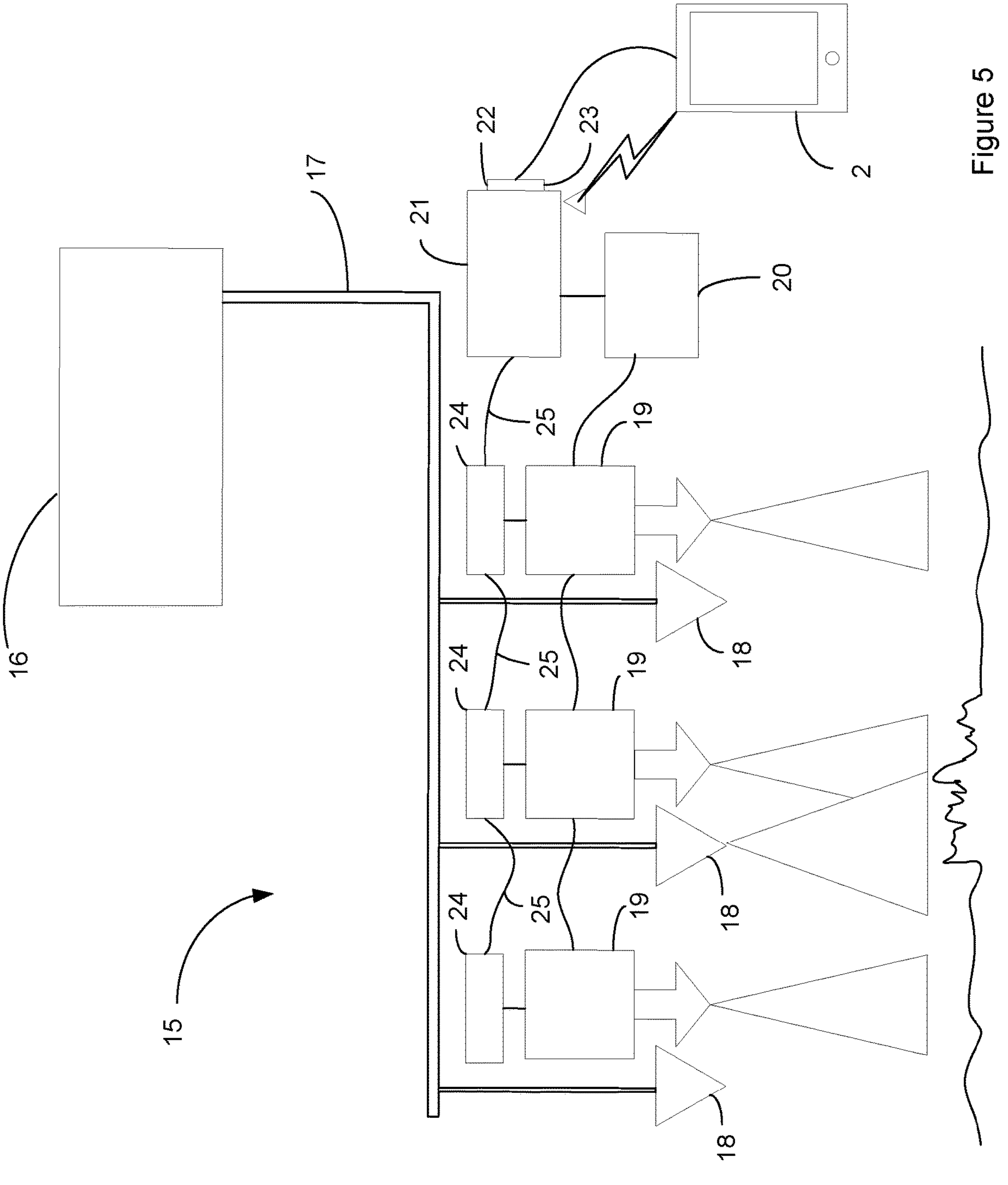
FIG. 5 shows a block diagram of the optical sensors, outlets and control system of a sprayer.

Referring to FIG. 5 a sprayer is shown. The components of a conventional sprayer include a tank 16, fluid conduit 17, outlet nozzles 18, optical sensors 19 and a controller 20. In this case a sub-controller 22 has been added that can communicate with the portable device 2 via port 22 or antenna 23. In this embodiment portable device 2 sends a single calibration value to sub-controller 21 and it communicates this value to sub controllers 24 via a bus such as a CAN bus. Each sub-controller 24 may be a programmable logic chip (GAL) installed in each sensor 19. The sub controllers 24 supply the calibration value to each optical sensor 19 to set the threshold at which spraying occurs. This solution may be readily retrofitted to existing equipment.

It will be appreciated that sub-controllers 21 and 24 would ideally be integrated into controller 20 and optical sensors 19 in a new machine. It will also be appreciated that where the controller includes position information that a plurality of calibration values may be provided with positional associations. Thus each optical sensor may utilize a different calibration value in dependence of its position.

The controller 20 may also record whether a spray nozzle outlet 19 is on or off at a given location and store this information. It may also store the calibration value used at that location. This information may be downloaded to portable device 2 and used for subsequent analysis. This information may be downloaded to a computer to develop substance application maps. By comparing a plurality of substance application maps from a plurality of spray applications at different times management information may be developed. This may be in the form of a map with different visual attributes indicating different conditions or required treatments (e.g. darker regions or certain colour or hatching indicating the number of times an area has been sprayed). This may enable a user to determine problems such as weed resistance and take remedial action (e.g. change the substance used or use alternative treatment). This information may also be utilized as feedback to improve an algorithm used to determine calibration values.

Utilisation of a portable device to develop and supply calibration information enables precise sampling of specific areas of an area of interest to provide more reliable calibration values. It also allows the operator to easily control very accurately the settings of the system. The approach also allows retrofitting to existing sprayers.

When an electronic positioning system is employed the system can record where a substance has been applied as well as the calibration values employed. This allows a user to map features such as the density of urine patches or weeds in a given area.

The system is scalable and can be utilized in variable rate application systems too where greater control is the required as to the application of a substance. In this case an algorithm may be employed to determine the rate of application based on calibration information and information from an optical sensor 19.

Aspects of the present invention have been described by way of example only and it should be appreciated that modifications and additions may be made thereto without departing from the scope thereof as defined in the appended claims.

The invention claimed is:

1. A calibration device suitable for use with a sprayer utilising calibratable optical sensors to control the distribution of a substance to plants via two or more controllable spraying outlets, the calibration device including:

a. an optical sensor for sensing optical characteristics of a plurality of sub-regions of an area of interest of a field or crop and producing optical sensor data based on the optical characteristics of the sub-regions of the area of interest;

b. a user interface for receiving user input of a type of each sub-region;

c. a processor which utilises the optical sensor data to develop a plurality of calibration parameters in the form of optical thresholds for controlling whether each calibratable optical sensor of the sprayer controls each controllable outlet to spray or not spray and associate each of the calibration parameters with a respective one of the types; and d. a transmitter for communicating the calibration parameters to a sprayer for calibration of the calibratable optical sensors, and wherein the calibration device is a handheld calibration device.

2. A calibration device as claimed in claim 1 wherein the calibration parameters produced are associated with positions in the area of interest.

3. A calibration device as claimed in claim 2 wherein the calibration device includes an electronic positioning system which generates position information that is associated with calibration parameters associated with a position.

4. A calibration device as claimed in claim 1 wherein high and low calibration parameters are developed by the calibration device for each optical sensor of a sprayer.

5. A calibration device as claimed in claim 1 including an optical sensor of the type employed as an optical sensor of a sprayer.

6. A calibration device as claimed in claim 5 wherein the optical sensor includes a camera.

7. A calibration device as claimed in claim 6 wherein the calibration device employs image recognition to identify regions to be sprayed or not sprayed.

8. A calibration device as claimed in claim 6 wherein calibration parameters are developed utilising information from both the camera and an optical sensor of the type employed as an optical sensor of a sprayer.

9. A calibration device as claimed in claim 1 wherein the calibration parameters are developed with the assistance of human input.

10. A calibration device as claimed in claim 9 wherein the device displays information obtained from sensing and presents a plurality of calibration parameters for user selection.

11. A calibration device as claimed in claim 9 wherein the device displays information obtained from sensing and a user enters one or more calibration parameters based on user assessment of the information.

12. A spraying system as claimed in claim 1, wherein the plurality of calibration parameters are associated with selected ones of the optical sensors of the sprayer and wherein different calibration parameter values are provided to selected ones of the optical sensors of the sprayer.

* * * * *